United States Patent

Kalweit

Patent Number: 6,084,077
Date of Patent: Jul. 4, 2000

[54] DISAZO DYESTUFFS

[75] Inventor: Detlef Kalweit, Lörrach, Germany

[73] Assignee: Clariant Fianance (BVI) Limited, Tortola, Virgin Islands (Br.)

[21] Appl. No.: 09/448,099

[22] Filed: Nov. 23, 1999

Related U.S. Application Data

[63] Continuation-in-part of application No. PCT/IB98/00788, May 22, 1998.
[51] Int. Cl.$^7$ ............ C09B 62/25; C09D 11/00; D06P 1/382
[52] U.S. Cl. ............ 534/637; 8/549; 106/31.48
[58] Field of Search ................ 534/637; 8/549; 106/31.48

[56] References Cited

U.S. PATENT DOCUMENTS

| | | | |
|---|---|---|---|
| 5,436,324 | 7/1995 | Reddig et al. | 534/637 X |
| 5,554,732 | 9/1996 | Nusser et al. | 534/637 |

FOREIGN PATENT DOCUMENTS

98/53009  11/1998  WIPO .

*Primary Examiner*—Fiona T. Powers
*Attorney, Agent, or Firm*—Scott E. Hanf

[57] ABSTRACT

The invention is concerned with compounds according to the formula

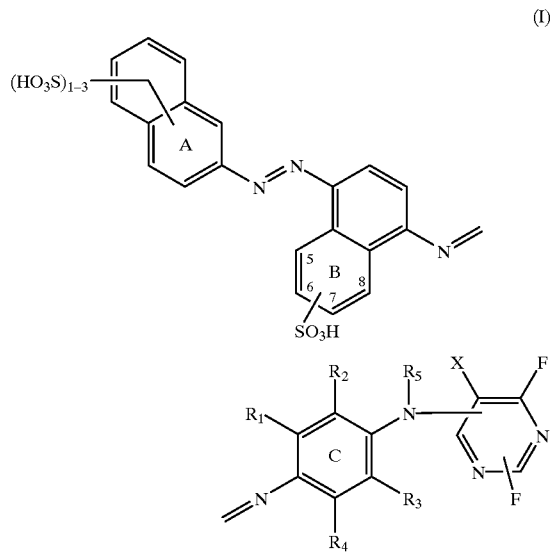

and their salts,
wherein
X represents hydrogen or chloro,
$R_1$ and $R_3$ represent hydrogen or methyl,
$R_2$ and $R_4$ represent hydrogen, methyl or methoxy, and
$R_5$ represents hydrogen or $C_{1-4}$alkyl,
which are useful as fiber-reactive dyestuffs in dyeing and printing hydroxy-group-containing as well as nitrogen-containing organic substrates and for the preparation of printing inks which are suitable for the ink jet process.

10 Claims, No Drawings

DISAZO DYESTUFFS

This application is a continuation-in-part of PCT International Application No. PCT/IB98/00788 filed May 22, 1998.

This invention relates to disazo-dyestuffs, methods for their preparation and their use as fiber-reactive dyestuffs in dyeing and printing processes.

According to the invention there are provided compounds according to the formula (I)

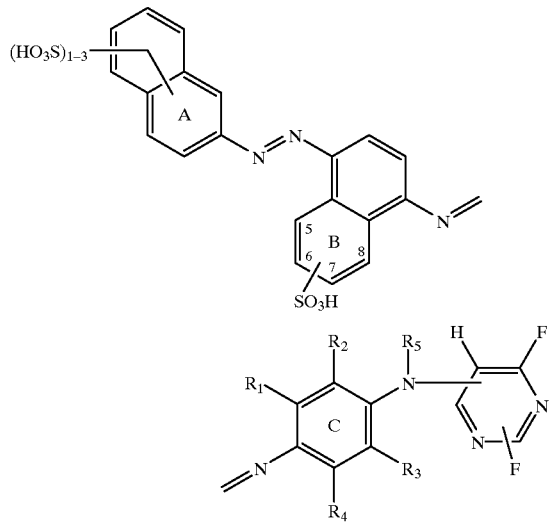

and their salts,
wherein
$R_1$ and $R_3$ represent hydrogen or methyl,
$R_2$ and $R_4$ represent hydrogen, methyl or methoxy, and
$R_5$ represents hydrogen or $C_{1-4}$alkyl.

Preferably the naphthaline radical A bears 2 or 3 sulfo groups. In ring B the sulfo group is attached to positions 6, 7 or 8. Preferably ring C is substituted by at least one methyl or methoxy group. Examples of substituted rings C are benzene rests obtained by coupling with m-toluidine, 2,5-dimethylaniline, 2-methoxy-5-methyl-aniline, 5-methoxy-2-methylaniline and 3,6-dimethyl-aniline.

A more preferred compound according to formula (I) is represented by the formula (Ia)

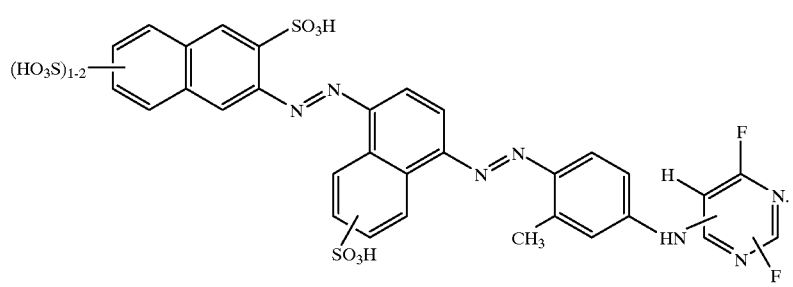

Compounds according to formula (I) may be formed in free acid or salt form.

When the compound of formula (I) is in salt form the cations associated with the sulfo groups are not critical and may be any one of those non-chromophoric cations conventional in the field of fiber-reactive dyes provided that the corresponding salts are water-soluble.

Examples of such cations are alkali metal cations and unsubstituted ammonium cations, e.g. lithium, sodium, potassium, ammonium, mono-, di-, tri- and tetra-methylammonium, tri-ethylammonium, and mono-, di-, and tri-ethanolammonium. The preferred cations are the alkali metal cations and the ammonium cation, with the sodium cation being the most preferred.

In a compound of formula (I) the cations of the sulfo groups can be the same or different, e.g., they can be a mixture of the above-mentioned cations meaning that the compound of formula (I) can be in a mixed salt form.

The invention provides in another of its aspects a method of forming compounds of formula (I), their salts or mixtures thereof which comprises reacting a compound according to the formula (II)

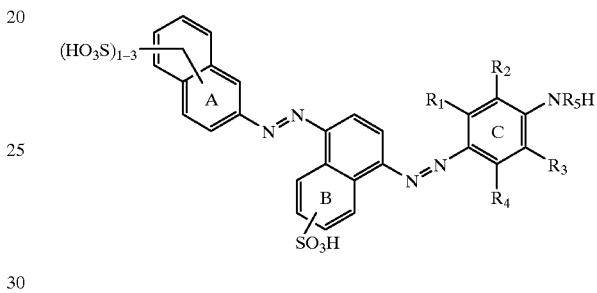

in which $R_1$, $R_2$, $R_3$, $R_4$ and $R_5$ have the meaning given above,
with a compound of the general formula (III)

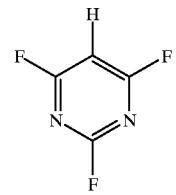

This condensation reaction proceeds according to a known method and is preferably carried out at a temperature of from 20–50° C., more preferably 30–40° C. and at a pH of 4–5.

The starting materials are either readily available or can be synthesized from commonly available raw materials.

The compounds of formula (I) may be isolated in accordance with known methods, e.g. by conventional salting out with alkali metal salts, filtering and drying optionally in vacuum and at slightly elevated temperature.

Depending on reaction and isolation conditions, a compound of formula (I) may be formed in free acid or preferably salt form or even mixed salt form containing, e.g. one or more of the above-mentioned cations.

Compounds of the formula (I) may be converted from free acid form to a salt form or mixture of salt forms or vice versa or from one salt form to another by conventional means.

The compounds of formula (I), their salts and mixtures thereof are reactive dyestuffs. They are suitable for dyeing and printing hydroxy-group-containing or nitrogen-containing substrates. They may produce dyeings or prints of a brown shade.

Accordingly in another aspect of the invention there is provided a process of dyeing or printing hydroxy-group-containing or nitrogen-containing organic substrates wherein the dyeing or printing is performed with compounds of formula (I) as hereinabove described, their salts or mixtures thereof.

Preferred substrates which may be mentioned are leather and fibrous materials which consist of or contain natural or synthetic polyamides and in particular natural or regenerated cellulose such as cotton, viscose or rayon staple fiber. The substrate which is usually preferred is textile material consisting of or containing cotton.

The compounds of formula (I), their salts or mixtures thereof may be employed in dye baths or in printing pastes according to all the dyeing or printing processes which are common in the field of reactive dyestuffs. Dyeing is preferably effected by the exhaust process from an aqueous medium and at a temperature range of 30–80° C., more preferably 50–60° C. and a salt content of from 10–80 g/l, preferably 10–50 g/l, more preferably 10–30 g/l. A preferred liquor-to-goods ratio (that is, liquor to substrate ratio) is from 4:1 to 30: 1, more preferably 6:1 to 20:1.

In yet another aspect of the invention there is provided the use of compounds hereinabove defined, their salts or mixtures thereof in dyeing or printing substrates as hereinabove described.

The compounds of this invention and their salts have good compatibility with known fiber-reactive dyestuffs. Accordingly, the compounds of the invention, their salts or mixtures thereof may be used individually in a dyeing or printing process or as a component in a combination dyeing or printing composition comprising other reactive dyestuffs of the same class, that is, reactive dyes which possess comparable dyeing properties, e.g. fastness properties and the extent of ability to exhaust from a dyebath on to a substrate. In particular, the dyestuffs of the invention may be employed in a trichromatic dyebath in conjunction with certain suitable yellow and blue dyestuffs having the same or other suitable reactive group in suitable proportions to produce a wide range of shades. The combination dyeings or prints obtained have fastness properties which are comparable to those of dyeings and prints made with individual dyestuffs according to the invention.

The compounds of formula (I), their salts or mixtures thereof give good exhaust and fixation yields when used as dyestuffs. Moreover, any unfixed dyestuff is easily washed off the substrates. The dyeings and prints formed exhibit good light fastness and good wet fastness properties such as wash, water, sea water and sweat fastness. They also exhibit good resistance to oxidizing agents such as chlorinated water, hypochlorite bleach, peroxide bleach and perborate-containing washing detergents.

The compounds of formula (I), their salts or mixtures thereof can also be used for the preparation of printing inks which are eminently suitable for the ink jet process.

The following examples are illustrative of the invention. In the examples, all parts and percentages are expressed by weight unless indicated to the contrary and all temperatures are given in degrees Celsius.

EXAMPLE 1

96 parts 2-aminonaphthalene-3,6,8-trisulfonic acid are put into 500 parts water and the pH is set at about 0.5 with hydrochloric acid. Under cooling with ice 18 parts of sodium nitrite are added and a solution of diazo salt obtained. 56 parts 2-aminonaphthalene-7-sulfonic acid are added and during coupling, the pH is kept at 3–4 with a solution of sodium carbonate. After the end of the first coupling reaction, 20 parts sodium nitrite are added to the obtained solution which is then poured into a mixture of ice and water, acidified with 100 parts of 30% hydrochloric acid. After the end of the diazotation, 27 parts of m-toluidine are added for coupling and the pH kept at 3–4 with a solution of sodium carbonate. After raising the pH to 5–6, 36 parts 2,4,6-trifluoropyrimidine are added and at a temperature of 50–60° C. the pH is kept at this value with a solution of sodium carbonate. At the end of the reaction the obtained dyestuff is salted out, filtered and dried at 50° C. under vacuum. In its free acid form, the dyestuff corresponds to the formula

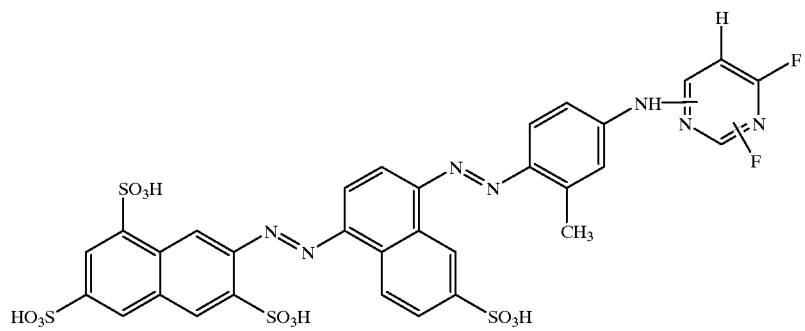

and dyes cotton to reddish brown shades with very good wet fastness. Particularly to be mentioned are the light fastness after irradiation with xenon light.

EXAMPLES 2–24

Table 1 discloses several dyestuffs which are formed according to methods analogous to the one described in Example 1 and employing corresponding starting materials. In all cases, the dyestuffs obtained dye or print cotton to a brown shade and dyeings and prints thus obtained display excellent light and wet fastness and are stable to oxidative influences.

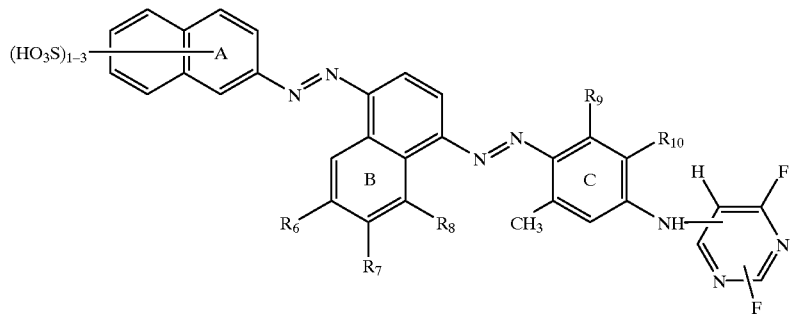

TABLE 1

| Ex. | Ring A Diazo component | Ring B R₆ | R₇ | R₈ | Ring C R₉ | R₁₀ |
|---|---|---|---|---|---|---|
| 2 | ![naphthalene with SO₃H, NH₂, SO₃H, HO₃S] | —SO$_3$H | —H | —H | —H | —H |
| 3 | " | —H | —H | —SO$_3$H | —H | —H |
| 4 | " | —SO$_3$H | —H | —H | —H | —CH$_3$ |
| 5 | " | —H | —SO$_3$H | —H | —H | —CH$_3$ |
| 6 | " | —H | —SO$_3$H | —H | —H | —OCH$_3$ |
| 7 | " | —SO$_3$H | —H | —H | —CH$_3$ | —H |
| 8 | ![naphthalene with SO₃H, NH₂, HO₃S, SO₃H] | —SO$_3$H | —H | —H | —H | —H |
| 9 | " | —H | —SO$_3$H | —H | —H | —H |
| 10 | " | —H | —H | —SO$_3$H | —H | —H |
| 11 | " | —SO$_3$H | —H | —H | —H | —CH$_3$ |
| 12 | " | —H | —SO$_3$H | —H | —H | —CH$_3$ |
| 13 | " | —SO$_3$H | —H | —H | —H | —OCH$_3$ |
| 14 | " | —H | —SO$_3$H | —H | —CH$_3$ | —H |
| 15 | ![naphthalene with SO₃H, NH₂, HO₃S, SO₃H] | —SO$_3$H | —H | —H | —H | —H |
| 16 | " | —H | —SO$_3$H | —H | —H | —H |
| 17 | " | —H | —H | —SO$_3$H | —H | —H |
| 18 | " | —H | —SO$_3$H | —H | —H | —CH$_3$ |
| 19 | " | —H | —H | —SO$_3$H | —H | —CH$_3$ |
| 20 | " | —SO$_3$H | —H | —H | —H | —OCH$_3$ |
| 21 | " | —SO$_3$H | —H | —H | —CH$_3$ | —H |

TABLE 1-continued

| | | Ring A | Ring B | | | Ring C | |
|---|---|---|---|---|---|---|---|
| Ex. | Diazo component | | $R_6$ | $R_7$ | $R_8$ | $R_9$ | $R_{10}$ |
| 22 | HO₃S-naphthalene-NH₂ with SO₃H | | —SO₃H | —H | —H | —H | —H |
| 23 | " | | —H | —SO₃H | —H | —H | —H |
| 24 | " | | —H | —H | —SO₃H | —H | —H |

EXAMPLES 25–30

Table 2 discloses several dyestuffs which are formed according to methods analogous to the one described in Example 1 and employing 1-aminonaphthalene derivates as starting materials. In all cases, the dyestuffs obtained dye or print cotton to a brown shade and dyeings and prints thus obtained display excellent light and wet fastness and are stable to oxidative influences.

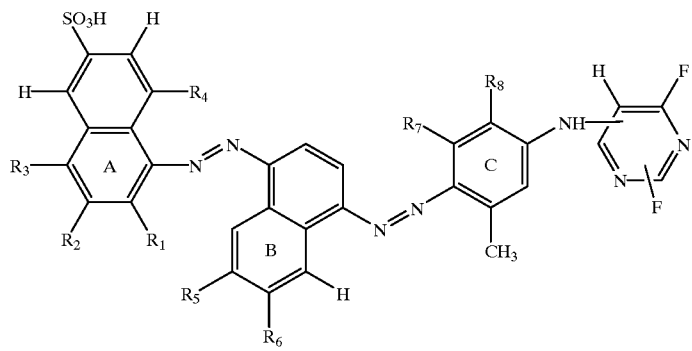

wherein $R_1$–$R_4$ are SO₃H or H.

TABLE 2

| Ex | | $R_5$ | $R_6$ | $R_7$ | $R_8$ |
|---|---|---|---|---|---|
| 25 | 1-amino-naphthalene with NH₂, SO₃H, HO₃S, SO₃H | —SO₃H | —H | —H | —H |
| 26 | " | —SO₃H | —H | —H | —CH₃ |
| 27 | naphthalene with HO₃S, NH₂, HO₃S, SO₃H | —SO₃H | —H | —H | —H |

TABLE 2-continued

| Ex | | $R_5$ | $R_6$ | $R_7$ | $R_8$ |
|---|---|---|---|---|---|
| 28 | " | —H | —SO₃H | —H | —OCH₃ |
| 29 | naphthalene with HO₃S, NH₂, HO₃S, SO₃H | —SO₃H | —H | —H | —H |
| 30 | " | —H | —SO₃H | —CH₃ | —H |

APPLICATION EXAMPLE A 0.3 Part of the dyestuff of Example 1 is dissolved in 100 parts of demineralized water and 3 g Glauber's salt (calcined) is added. The dyebath is heated to 50° C., then 10 parts of cotton fabric (bleached) are added. After 30 minutes at 50° C., 0.4 part of sodium carbonate (calcined) is added to the bath. During the addition of sodium carbonate the temperature is kept at 50° C. Subsequently, the dyebath is heated to 60° C., and dyeing is effected for a further one hour at 60° C. The dyed fabric is then rinsed with running cold water for 3 minutes and afterwards with running hot water for a further 3 minutes. The dyeing is washed at the boil for 15 minutes in 500 parts of demineralized water in the presence of 0.25 part of Marseille soaps. After being rinsed with running hot water (for 3 minutes) and centrifuged, the dyeing is dried in a cabinet drier at about 70° C. A brown cotton dyeing is obtained showing good fastness properties, and particularly high wet fastness properties, which is stable towards oxidative influences.

APPLICATION EXAMPLE B

To a dyebath containing in 100 parts of demineralized water and 3 g Glauber's salt (calcined) 10 parts of cotton fabric (bleached) are added. The bath is heated to 50° C. within 10 minutes, and 0.5 part of the dyestuff of Example 1 is added. After a further 30 minutes at 50° C., 1 part of sodium carbonate (calcined) is added. The dyebath is then heated to 60° C. and dyeing is continued at 60° C. for a further 45 minutes. The dyed fabric is rinsed with running cold and then hot water and washed at the boil according to the method of application Example A. After rinsing and drying a brown cotton dyeing is obtained which has the same good fastness properties as indicated in Application Example A.

Similarly, the dyestuffs of Examples 2–30 or mixtures of the exemplified dyestuffs are employed to dye cotton in accordance with the method described in Application Example A or B. The cotton dyeings thus obtained are brown and show good fastness properties.

APPLICATION EXAMPLE C

A printing paste consisting of

| | |
|---|---|
| 40 | parts of the dyestuff of Example 1 |
| 100 | parts of urea |
| 350 | parts of water |
| 500 | parts of a 4% sodium alginate thickener and |
| 10 | parts of sodium bicarbonate |
| 1000 | parts in all | is applied to cotton fabric in accordance with conventional printing methods. The printed fabric is dried and fixed in steam at 102–104° C. for 4–8 minutes. It is rinsed in cold and then hot water, washed at the boil (according to the method described in Application Example A) and dried. A brown print is obtained which has good general fastness properties. Similarly, the dyestuffs of Examples 2 to 30 or mixtures of the exemplified dyestuffs are employed to print cotton in accordance with the method given in Application Example C. All prints obtained are brown and show good fastness properties.

APPLICATION EXAMPLE D 3 parts of the dyestuff of Example 1 are dissolved in 83 parts demineralized water and 15 parts diethylene glycol at 60° C. After cooling to room temperature, one obtains a brown printing ink, which is eminently suitable for printing paper or textile materials consisting of cotton according to the ink jet process.

Similarly, the dyestuffs of Examples 2 to 30 or mixtures of the exemplified dyestuffs can be used for the preparation of printing ink in accordance with the method given in Application Example D.

What is claimed is:

1. A compound according to the formula (I)

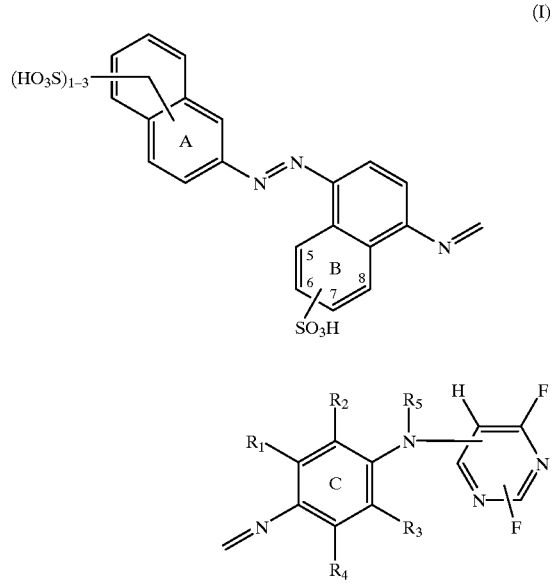

or a salt or mixture thereof, wherein $R_1$ and $R_3$ represent hydrogen or methyl, $R_2$ and $R_4$ represent hydrogen, methyl or methoxy, and $R_5$ represents hydrogen or $C_{1-4}$alkyl.

2. A compound according to claim 1 having the formula (Ia)

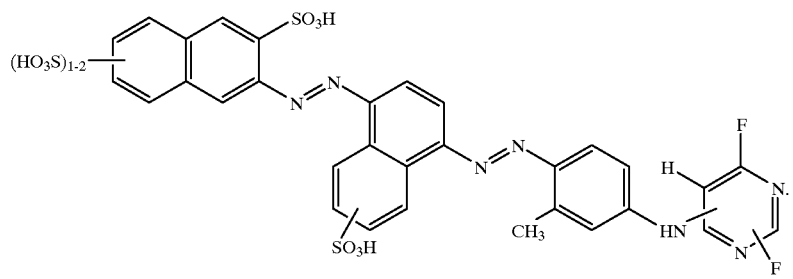
(Ia)

3. A method of forming compounds of formula (I), their salts or mixtures thereof which comprises reacting a compound according to the formula (II)

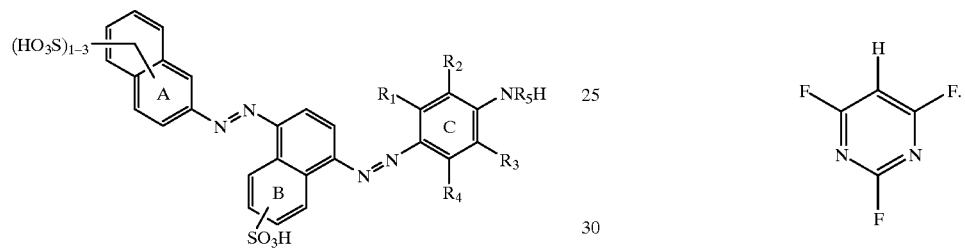
(II)

with a compound of the general formula (III)

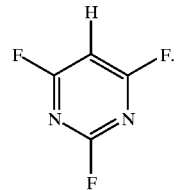
(III)

in which $R_1$, $R_2$, $R_3$, $R_4$ and $R_5$ have the meaning given in claim 1, 4. A compound according to the formula (Ib)

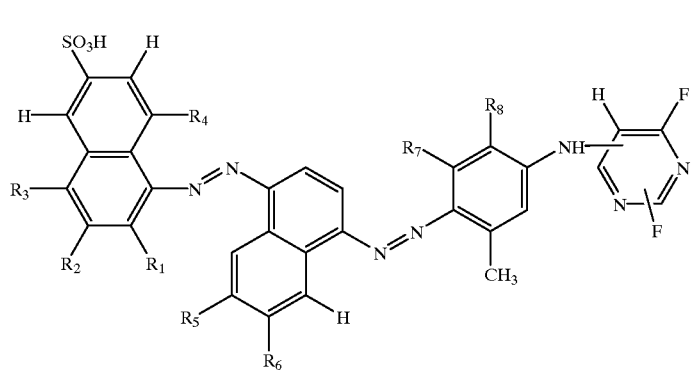
(Ib)

or a salt or mixture thereof, wherein $R_1$–$R_6$ represent hydrogen or $SO_3H$, $R_7$ represents hydrogen or methyl, $R_8$ represents hydrogen, methyl or methoxy.

5. A compound according to claim 4 with the formula

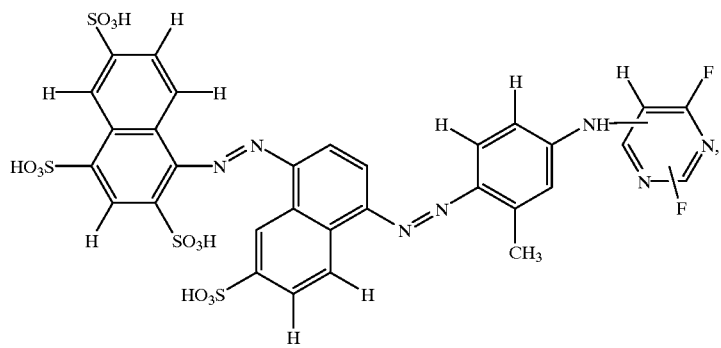
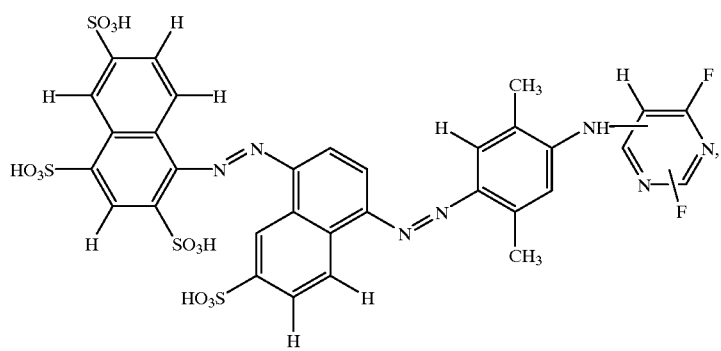
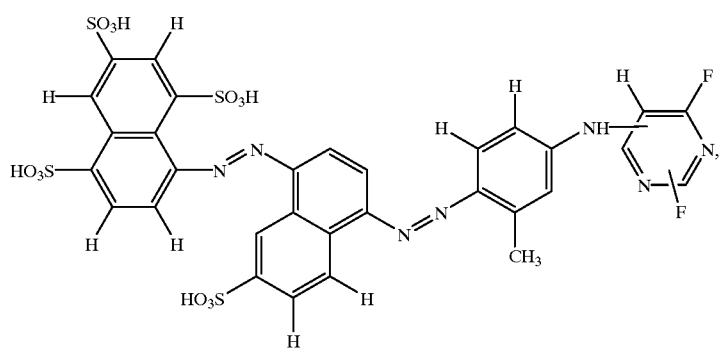
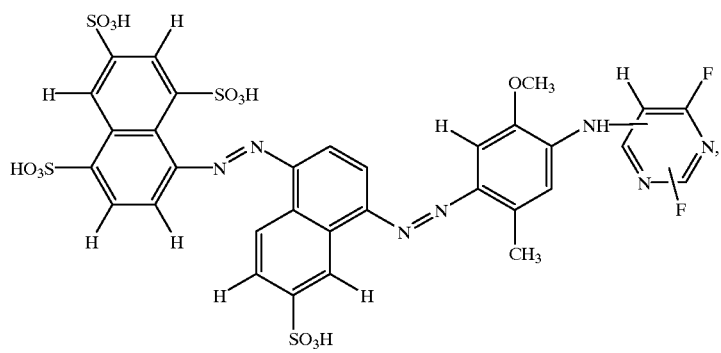

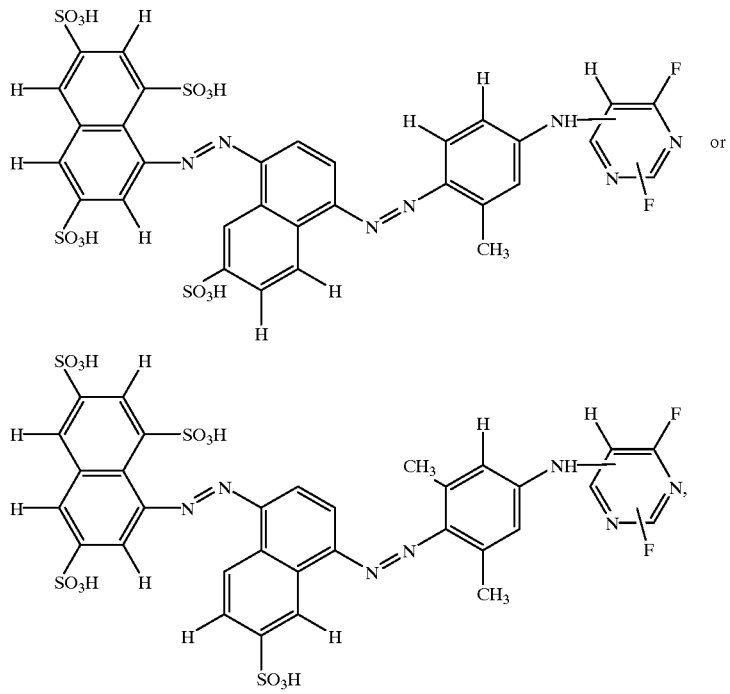

or a salt or mixture thereof.

6. A method of forming compounds of formula (Ib), their salts or mixtures thereof which comprises reacting a compound according to the formula (IIa)

(IIb)

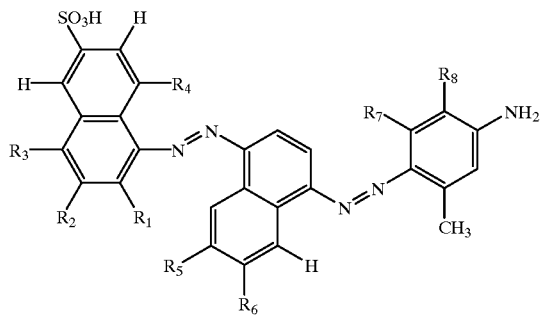

in which $R_1$, $R_2$, $R_3$, $R_4$ and $R_5$ have the meaning given in claim 1, with a compound of the general formula (III)

(III)

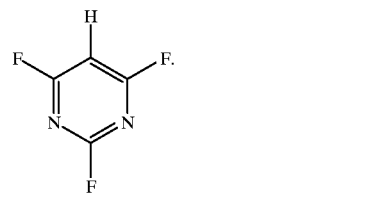

7. A process of dyeing or printing hydroxy-group-containing or nitrogen-containing organic substrates comprising applying thereto compounds of formula (I) according to claim 1 or formula (Ib) according to claim 4 as hereinabove described, their salts or mixtures thereof.

8. Hydroxy-group-containing or nitrogen-containing organic substrates dyed or printed with compounds as defined in claim 1 and claim 4, their salts or mixtures thereof.

9. Textile material according to claim 7 consisting of or containing cotton dyed or printed with compounds in claim 1 and claim 4, their salts or mixtures thereof.

10. Printing inks which are suitable for the ink jet process and contain a compound of formula (I) according to claim 1 or formula (Ib) according to claim 4, its salts or mixtures thereof.

* * * * *